May 13, 1969 S. W. LIDDLE ET AL 3,443,768

ENDLESS TAPE CARTRIDGE

Filed Aug. 12, 1966 Sheet 1 of 2

INVENTORS
STEPHEN W. LIDDLE &
CHARLES G. HAWKINS
BY Eugene M. Whitacre
Attorney

INVENTORS
STEPHEN W. LIDDLE &
CHARLES G. HANKINS
BY Eugene M. Whitacre
Attorney

United States Patent Office
3,443,768
Patented May 13, 1969

3,443,768

ENDLESS TAPE CARTRIDGE

Stephen W. Liddle and Charles G. Hawkins, Indianapolis, Ind., assignors to Radio Corporation of America, a corporation of Delaware Filed Aug. 12, 1966, Ser. No. 572,136
Int. Cl. B65h 75/36
U.S. Cl. 242—55.19 2 Claims

ABSTRACT OF THE DISCLOSURE

A magnetic tape cartridge in which an endless coil of tape is supported on a spool having a central hub and integral, coil supporting flange provided with concentric grooves formed in a plurality of radiating rib members which serve to distribute the weight of the tape when the cartridge is used in an inclined position.

This invention relates to tape cartridges, and more particularly to tape cartridges adapted for use with an endless loop of magnetic tape.

In the use of tape cartridges of the type containing an endless loop of magnetic tape spirally wound around the hub of a reel or spool, it has sometimes been necessary to mount the playback unit such that the tape cartridge is received therein at an incline with the horizontal plane. In certain automobiles, for example, due to the dashboard configuration and/or limited mounting space, the playback unit is positioned such that the tape cartridge is received therein at an angle with the horizontal plane of up to 45 degrees. When the received tape cartridge is operated in this inclined mode, the weight of the tape roll puts an added force against the core or hub of the reel so that an excessive drag is created on the tape roll as the inside tape turn is pulled free from the reel during the operation of the cartridge. This excessive drag may manifest itself in the form of tape slippage, excessive wear on the tape, and an undesirably high wow and flutter which is indicative of non-uniform motion in the cartridge.

It is an object of the present invention to provide an improved tape cartridge.

It is another object of the present invention to provide an improved tape cartridge which is operable in an inclined position without providing a substantial increase in the drag on the tape roll.

It is a further object of the present invention to provide an improved tape cartridge which may be satisfactorily operated in an inclined mode.

A still further object of the present invention is to provide an improved tape cartridge having an improved spool component for carrying the cartridge tape roll such that during operation of the cartridge in an inclined position, the weight of the tape roll on the spool hub portion is not substantially increased.

In accordance with an embodiment of the invention, an endless loop tape cartridge includes a rotatably mounted spool having a hub portion and a circular bottom plate, with the bottom plate supporting a roll of tape spirally wound about the spool hub portion. The bottom plate is provided with a plurality of corrugations on the tape supporting surface thereof in annular arrangement and in surrounding relation to the hub portion.

The novel features which are considered to be characteristic of this invention are set forth in the appended claims. The invention itself, however, both as to its organizations and method of operation as well as additional objects and advantages thereof will best be understood from the following description when read in connection with the accompanying drawings in which:

Figure 2:
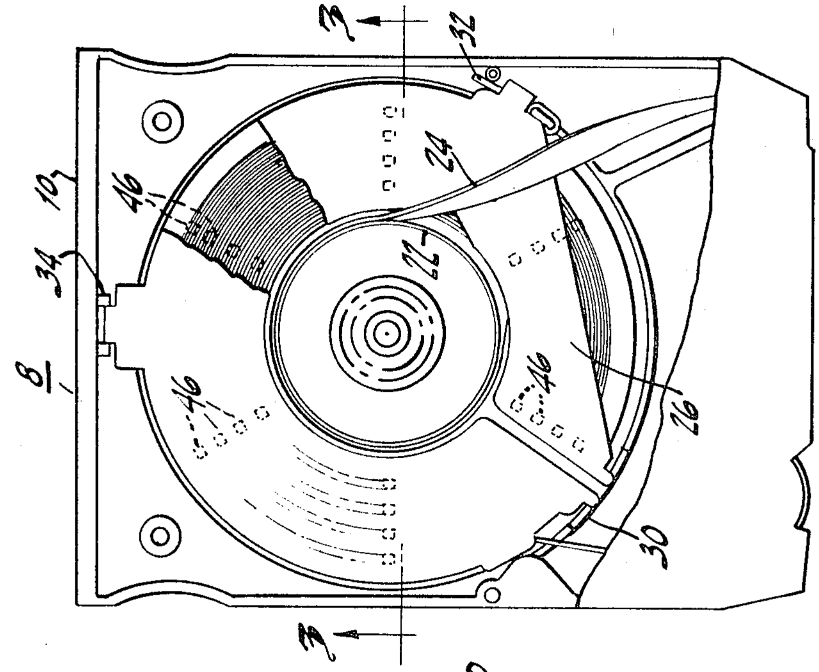
FIGURE 2 is a top plane view partially in section of an endless loop tape cartridge embodying the invention.
Figure 3:
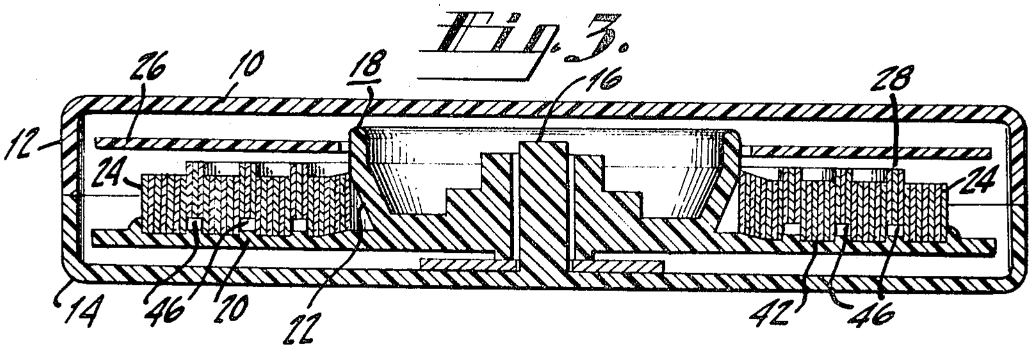
FIGURE 3 is an enlarged front sectional view of the cartridge taken on section line 3—3 of FIGURE 2.

Referring to the drawing wherein like reference numerals will be used to designate like parts in the various figures, and particularly to FIGURES 2 and 3, the tape cartridge 8 includes a rectangularly shaped casing 10 having complementary top 12 and bottom 14 portions. An upright spindle 16 on the bottom portion 14 of the casing 10 serves as a bearing for the tape spool 18. The tape spool 18 includes a circular bottom plate or turntable 20 and an integrally formed tapered hub 22 about which a magnetic tape 24 is spirally wound. The spool 18 is rotatably mounted on the spindle 16.

An annular disc 26 is disposed about the top portion of the hub 22 and supported over the top edge 28 of the spiralled tape 24 by means of notched studs 30, 32 and 34 projecting upwardly from the bottom portion 14 of the casing 10. The inside diameter of the disc 26 is slightly larger than that of the hub 22 to provide a clearance area between the hub 22 and the inside perimeter of the disc 26 to permit the innermost convolution or turn of the tape roll 24 to be brought out over the top face of the disc 26 toward the front of the cartridge as is known. The periphery of the spiral roll of tape 24 is constrained on the plate 20 by means of a downwardly extending annular flange (not shown) on the underside of the underside of the top portion 12 of the casing 10 and by the studs 30, 32 and 34.

Figure 1:
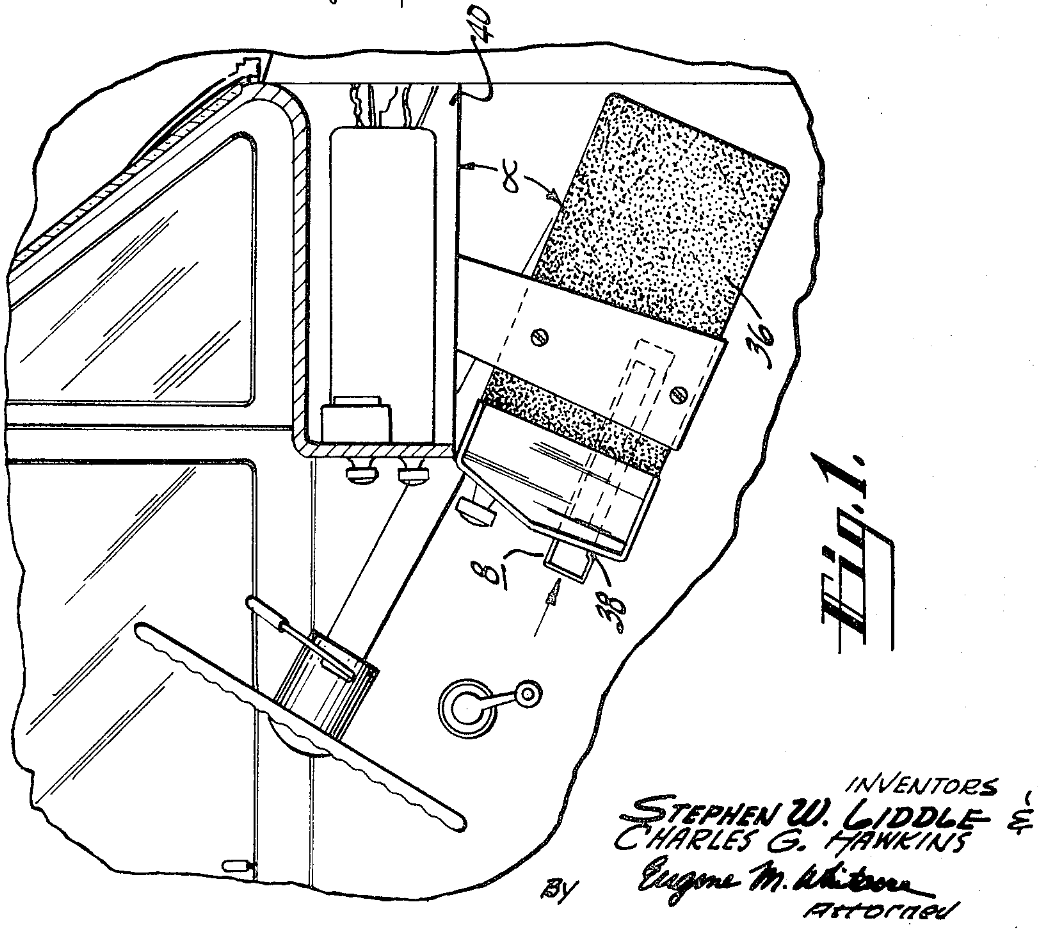
FIGURE 1 is a partial view in side elevation of the interior of an automobile showing the dashboard thereof mounting a tape player and received cartridge in an inclined position.

In FIGURE 1 there is shown a playback unit 36 having a receptacle 38 in which there is inserted an endless loop tape cartridge 8. The unit 36 is shown mounted under the dashboard 40 of an automobile and positioned so as to receive the tape cartridge 8 at an angle $\alpha$ with the horizontal plane. Depending on the dashboard 40 design and playback unit 36 installation, the playback angle $\alpha$ of the received cartridge 8 has been found to vary from a horizontal or zero degrees to angles as high as 45°.

It is to be understood, however, that cartridge playback units are presently available for use and installation in the home as well as in automobiles and that the automobile mounting of the playback unit and cartridge in FIGURE 1 is shown only for illustrative purposes to indicate an application of the tape playback unit in which operation of a received endless loop tape cartridge is at an incline or angle with the horizontal plane. With the cartridge mounted in such an inclined position, it has been found that the weight of the tape roll will cause it to be supported by a portion of the hub periphery, thereby substantially increasing the drag by said hub on the tape roll so as to inhibit the free pulling of the innermost convolution of the tape during the operation of the cartridge. In other words when the cartridge is operated at an angle to horizontal, the weight of the tape roll causes it to "falldown" and bear against a portion of the hub periphery. When the cartridge runs in this inclined mode, the weight of the tape roll puts a force against the core or hub of the tape spool so that an added drag is created on the tape roll as the innermost convolution thereof is pulled away from the turntable. This added drag may cause variations in the tape speed and a resulting increase in the wow and flutter characteristics in the cartridge as well as excessive wear on the tape itself.

To alleviate these undesirable effects and improve the performance characteristics of the cartridge, an improved tape cartridge is provided in which the tape spool turntable or bottom plate which supports the tape roll is modified so as to cause a re-distribution of the weight of the tape roll across the bottom plate surface when the cartridge is operated in an inclined position.

Figures 4, 5:
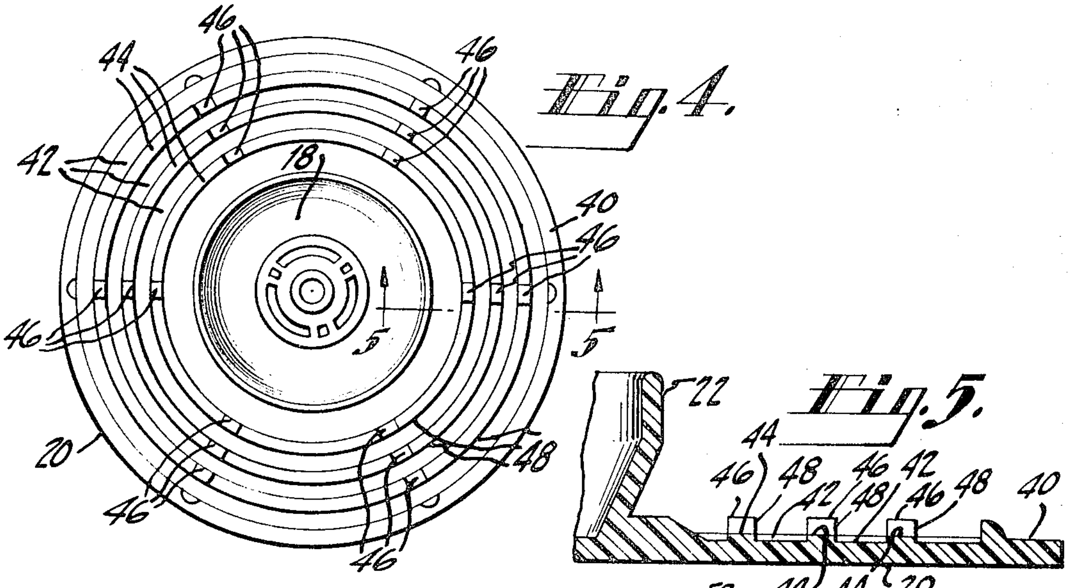
FIGURE 4 is a top view of the tape spool used in the cartridge shown in FIGURES 1, 2 and 3.
FIGURE 5 is an enlarged fragmentary sectional view of the tape spool taken on section line 5—5 of FIGURE 4.

In FIGURES 4 and 5 the bottom plate portion 20 of the tape spool 18 in accordance with the present invention is shown. The tape supporting surface 40 of the bottom plate 20 is corrugated to provide a plurality of equally spaced concentric channels 42 separated by land areas 44. A plurality of sets of protuberances 46 on the land areas 44 and integral therewith are positioned in a plurality of rows extending in different radial directions from the hub portion 22. The channels 42 serve to capture portions of the tape roll 24 therein so as to provide a support for said tape roll portions when the roll is tilted as when the cartridge 8 is operated at an angle other than horizontal. Thus these channeled areas 42 cause the weight of the tape roll 24 to be distributed along the surface 40 of the bottom plate 20 and within the corrugations thereon.

In the embodiment shown, the widths of the land areas 44 of the corrugations (including the protuberances 46) are substantially equal to the channeled areas 42 therebetween, ⅛" having been found to provide a suitable width dimension for a spool carrying a ¼" tape. If desired the outboard sides 48 of the protuberances 46 may be sloped downwardly (not shown) away from the hub 22 to provide ramp surfaces to facilitate reeling of the tape during operation of the cartridge. The effect of these corrugations along the spool bottom plate 20 on the tape roll 24 is such that a stepped appearance is imparted to the edged surface 28 of the roll (FIGURE 3).

Figures 6, 7:
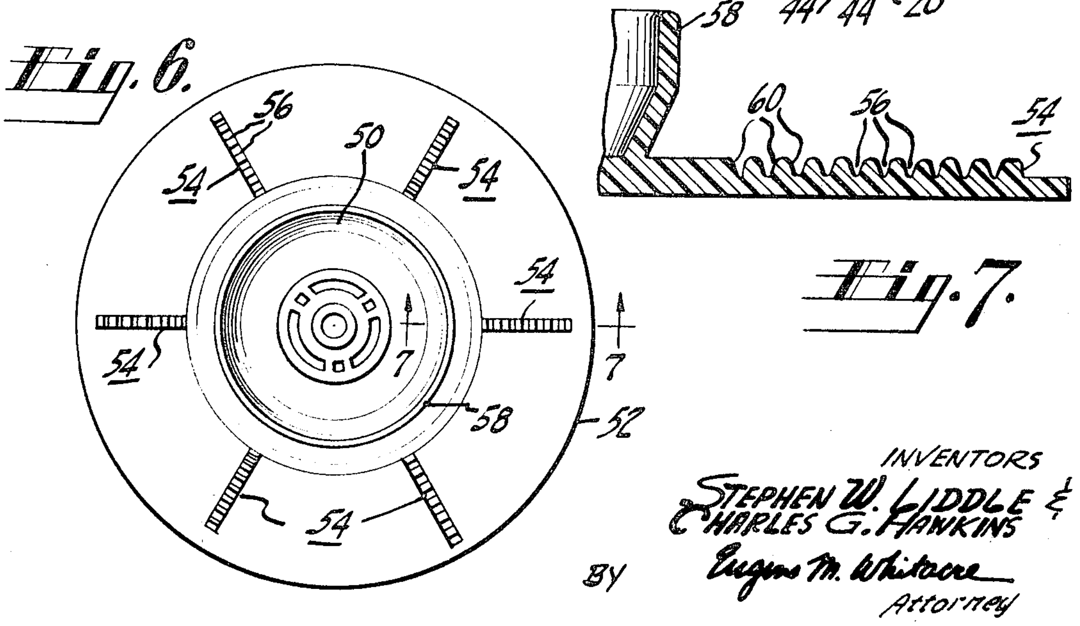
FIGURE 6 is a top view of another embodiment of a tape spool suitable for use in the cartridge shown in FIGURE 1, 2 and 3.
FIGURE 7 is an enlarged fragmentary sectional view of the tape spool of FIGURE 6 and taken along the section line 7—7 thereof.

In FIGURES 6 and 7 there is shown another embodiment of a tape spool 50 suitable for use in the cartridge of the invention. As can be seen from the enlarged sectional view of the spool 50 (FIGURE 7), the bottom plate 52 is provided with a plurality of radially extending rib members 54 which are cut by spiral like grooves 56 annularly arranged in surrounding relation to the hub portion 58. The grooves 56 are cut such that the pitch of the spiral advances the tape toward the center when the turntable or bottom plate 52 is rotated by the tape in a clockwise direction. The groove walls 60 formed in the rib members 54 define channeled areas therebetween in which portions of the tape roll 24 are captured so as to provide support for the tape when the cartridge is operated at an angle with the horizontal, thereby substantially reducing the load of the tape roll from the hub of the turntable.

Thus, in accordance with the present invention there is provided an improved endless loop tape cartridge in which the turntable portion of the tape spool is annularly grooved or corrugated in surrounding relation to the spool hub portion so as to provide support for the tape roll when the cartridge is operated at an angle with the horizontal and thereby substantially remove the load of the tape roll from the hub of the turntable. The grooved turntable gives a tape roll a stepped appearance along its top edge surface area, which evidences that portions of the tape are captured within the grooves or between the corrugated ridges. This provides the support needed to prevent the entire tape roll from being carried by a portion of the hub periphery and causing an added drag on the tape roll which may impede the free pulling of the innermost convolution of the tape roll when the cartridge is operated in an inclined position.

What is claimed is:

1. In an endless loop tape cartridge of the type including a rotatably mounted spool having a hub portion and a circular bottom plate supporting a roll of tape spirally wound about the spool hub portion, the improvement comprising:

means providing a plurality of corrugations on the tape supporting surface of said bottom plate annularly arranged substantially in concentric surrounding relation to said hub portion;

said means including a plurality of corrugated rib members spaced along the tape supporting surface of said bottom plate and extending substantially radially outward from said hub portion, said rib members corrugations providing protuberances on the land areas which separate the annularly arranged corrugations on the tape supporting surface of said bottom plate.

2. An endless loop tape cartridge of the type including a rotatably mounted hub portion containing a roll of tape spirally wound therearound comprising:

a turntable integral with said hub member and having a surface in supporting relation to said tape roll; and a plurality of rib members spaced along the tape supporting surface of said turntable and extending radially outward from said hub member, said rib members being grooved to define a plurality of protuberances separating a corresponding plurality of channeled areas annularly arranged in substantially concentric surrounding relation to said hub member.

References Cited

UNITED STATES PATENTS

| | | | |
|---|---|---|---|
| 1,713,921 | 5/1929 | Rouiller | 242—55.19 |
| 2,398,639 | 4/1946 | Heyer | 242—55.19 |
| 3,088,687 | 5/1963 | Martin. | |
| 3,126,162 | 3/1964 | MacKenzie. | |
| 3,350,028 | 10/1967 | Lear. | |

BILLY S. TAYLOR, *Primary Examiner.*

U.S. Cl. X.R.

242—71.8